(12) United States Patent
Kernchen

(10) Patent No.: US 11,486,479 B2
(45) Date of Patent: Nov. 1, 2022

(54) HYDRODYNAMIC CONVERTER

(71) Applicant: Voith Patent GmbH, Heidenheim (DE)

(72) Inventor: Reinhard Kernchen, Satteldorf (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 17/317,955

(22) Filed: May 12, 2021

(65) Prior Publication Data

US 2021/0262557 A1 Aug. 26, 2021

Related U.S. Application Data

(63) Continuation of application No. PCT/EP2019/077274, filed on Oct. 9, 2019.

(30) Foreign Application Priority Data

Nov. 14, 2018 (DE) ...................... 10 2018 128 470.5

(51) Int. Cl.
*F16H 41/26* (2006.01)
*F16H 61/56* (2006.01)

(52) U.S. Cl.
CPC ............. *F16H 41/26* (2013.01); *F16H 61/56* (2013.01)

(58) Field of Classification Search
CPC .......... F16H 41/04; F16H 41/26; F16H 64/56; F16D 33/02; F16D 33/04; F16D 33/18; F16D 33/20
See application file for complete search history.

(56) References Cited

U.S. PATENT DOCUMENTS 3,242,677 A * 3/1966 Kelley ................. F16H 47/085
                                              74/DIG. 3
3,888,082 A * 6/1975 Haide ..................... F16H 41/26
                                                  60/367

(Continued)

FOREIGN PATENT DOCUMENTS

DE     10 2004 011 033 B3     12/2005
DE     10 2007 005 426 B3     5/2008

(Continued)

OTHER PUBLICATIONS

Notification of the Transmission of the International Search Report and Written Opinion of the International Search Authority or Declaration dated Jan. 17, 2020 for International Application No. PCT/EP2019/077274 (10 pages).

(Continued)

*Primary Examiner* — Michael Leslie
(74) *Attorney, Agent, or Firm* — Taylor IP, P.C.

(57) ABSTRACT

A high-speed hydrodynamic adjustable converter having a working chamber for forming a hydrodynamic working medium circuit wherein a pump wheel, a turbine wheel and a guide wheel are positioned in the working chamber. The working medium flows through the pump wheel centrifugally or centrifugally-diagonally; and the working medium flows through the turbine wheel centripetally or centripetally-diagonally. The inlet grate edge of the turbine wheel, with respect to an axis of rotation of the pump wheel and the turbine wheel, is positioned on a smaller or equal radius than an inlet grate edge of the pump wheel. The hydrodynamic converter has a first guide wheel in the working chamber before the pump wheel viewed in the direction of flow of the working medium, the guide wheel being arranged for purely centrifugal or diagonal-centrifugal throughflow of the working medium and is used to influence the power transmission.

17 Claims, 2 Drawing Sheets

(56) References Cited

U.S. PATENT DOCUMENTS

| | | | |
|---|---|---|---|
| 4,751,817 A | * | 6/1988 | Graf Von Ingelheim .................. F01D 17/105 60/357 |
| 2017/0198793 A1 | * | 7/2017 | Degregorio ......... F16H 57/0006 |

FOREIGN PATENT DOCUMENTS

| | | |
|---|---|---|
| DE | 10 2010 018 160 B3 | 9/2011 |
| WO | 02/14706 A2 | 2/2002 |
| WO | 2010/062269 A1 | 6/2010 |

OTHER PUBLICATIONS

German Office Action dated May 10, 2019 for German Application No. 10 2018 128 470.5 (12 pages).

* cited by examiner

HYDRODYNAMIC CONVERTER

CROSS REFERENCE TO RELATED APPLICATIONS

This is a continuation of PCT application No. PCT/EP2019/077274, entitled "HYDRODYNAMIC CONVERTER", filed Oct. 9, 2019, which is incorporated herein by reference.

BACKGROUND OF THE INVENTION

1. Field of the Invention

The current invention relates to a hydrodynamic converter.

2. Description of the Related Art

Hydrodynamic converters have been known for many decades. They are used, for example, in hydrodynamic transmissions of rail vehicles as start-up converters or as cruising converters. Automatic two-speed transmissions or multi-speed transmissions can be created with them, subject to the number of converters used as hydrodynamic power transmitters. Start-up converters usually have their design point at a speed ratio of the turbine speed relative to the pump speed, that is the speed ratio between the speed of the turbine wheel and the speed of the pump wheel, between 0.4 to 0.6; extreme starting converters also around 0.3. The cruising converters often have a corresponding speed ratio between 0.8 and 0.9. This means that at the design point, that is at the rated speed of the vehicle, the turbine wheel rotates slower than the pump wheel. In the case of the cruising converters, the turbine wheel can be used in a rail vehicle up to a speed ratio of between 1.3 to approx. 1.5, subject to the design of the cooling system.

A hydrodynamic converter of this type is disclosed, for example in DE 10 2010 018 160 B3, wherein the working medium of the circulatory flow in the working chamber flows at least partially, centrifugally through the pump wheel; wherein the working medium of the circulatory flow, flows, at least partially, centrifugally through a guide wheel. In such a case of the converter is also referred to as a guide vane ring because, in contrast to the pump wheel and the turbine wheel, it does not rotate; and wherein the direction of inflow of the working medium of the circulatory flow progresses onto the turbine wheel, parallel to the axis of rotation in axial direction of the hydrodynamic converter, whereas the outflow direction of the working medium of the circulatory flow out of the turbine wheel progresses partially centripetally and partially in the axial direction, thus diagonally.

For industrial applications, hydrodynamic converters are often designed as influenceable converters with an adjustable guide wheel. Several guide wheels could however also be provided—one adjustable and the other fixed. In the adjustable guide wheel the vanes are adjustable during operation in order to be able to continuously change the power consumption and the power transfer of the converter. One design example for such a hydrodynamic converter is disclosed, for example, in DE 10 2007 005 426 B3.

Even with the conventional industrial hydrodynamic converters for industrial applications the speed ratio is mostly limited in favor of high torque transmissions; they are consistent in their design with the described starting and cruising converters.

WO 02/14706 A2 discloses a hydrodynamic converter for use in a machine set, wherein the drive is a gas turbine, and the working machine is a compressor. This involves exceptionally high outputs which are in the order of magnitude of 20 MW or higher. Based on these extreme performances, the machines also have exceptionally large rotating masses. The hydrodynamic converter has an extremely low λ-value. The speed ratio between the speed of the turbine wheel and that of the pump wheel is in the order of magnitude of 1. The efficiency is in the order of magnitude of 0.75 and higher. Flow through the pump wheel is substantially centrifugal and through the turbine wheel substantially centripetal, wherein the inlet edges of the pump wheel blades, and the outlet edges of the turbine wheel blades, are situated opposite one another. The inlet edges of the pump wheel blades and the outlet edges of the turbine wheel blades are closer to the converter's axis of rotation than the outlet edges of the pump wheel blades, and the inlet edges of the turbine wheel blades.

DE 10 2004 011 033 B3 discloses a hydrodynamic converter with a centrifugal flow through a pump wheel and a centripetal flow through a turbine wheel, wherein the trailing edges of the pump wheel are positioned on a larger radius then the leading edges of the turbine wheel. The leading edges of the blades of the pump wheel can moreover be positioned on a larger radius than the leading edges of the blades of the turbine wheel. Guide vanes are provided in the radial outer region between the pump wheel and the turbine wheel, and guide vanes are provided in the radial inner region between the turbine wheel and the pump wheel, wherein the flow through the guide vanes occurs in an axial direction.

WO 2010/062269 A1 is based on a hydrodynamic converter of the previously described type and proposes arranging the pump wheel with centripetal flow radially outside of the turbine wheel through which the flow occurs in centripetal or axial directions. Guide vanes can then be positioned before the pump wheel with the flow through them also occurring in the centripetal direction.

SUMMARY OF THE INVENTION

It is the objective of the current invention to specify a hydrodynamic converter which is suitable, especially for a high-speed ratio in the design point, above the speed ratio of hitherto known cruising converters, as well as for a wide working range around the design point.

A hydrodynamic converter according to the present invention has a working chamber for forming a hydrodynamic working medium circuit for the working medium. Special consideration is given to oil as the working medium, however another medium, for example, water or a water mixture, in particular a water-glycol-mixture is also considered. At least one pump wheel, at least one turbine wheel and at least one guide wheel are positioned in the working chamber, one after another, in the direction of flow of the working medium. Viewed in the flow direction, a guide wheel generally follows the pump wheel, and the turbine wheel follows the guide wheel. Moreover, an additional guide wheel can, for example, be provided in the flow direction before the pump wheel, wherein the guide wheel is then advantageously adjustable. This means its guide vanes, or at least some of them, are respectively rotatable around an axis of rotation, which is also referred to as vane axis of rotation, so that the guide wheel is variably adjustable relative to the working medium flow. If an adjustable guide wheel is provided, the term "influenceable" converter is also used.

The converter, according to the present invention, is in particular designed as a so-called high-speed converter. This means it has an especially large design speed ratio, which will be discussed later.

According to the present invention, the working medium flows through the pump wheel centrifugally, in particular purely centrifugally or centrifugally-diagonally, and the working medium flows through the turbine wheel centripetally, in particular purely centripetally or centripetally-diagonally.

Thus, the working medium enters the turbine wheel centripetally and flows centripetally or partially centripetally and partially axially out of the turbine wheel.

A radius of an inlet grate edge of the turbine wheel is smaller or the same as the radius of an inlet grate edge of the pump wheel. Such an inlet grate edge of the turbine wheel can also be referred to as the inlet edge of the blades of the turbine wheel and defines the edge of the blades of the turbine wheels onto which the flow is directed. Accordingly, an outlet grate edge or outlet edge defines the flow-off edge of the blades of the turbine wheel. The same also applies for the other wheels, that is the pump wheel and the guide wheel or wheels.

The hydrodynamic converter is preferably designed as a single step hydrodynamic converter with a single turbine wheel.

Preferably, also, only a single pump wheel which is arranged for a pure centrifugal or centrifugal-diagonal flow with the working medium. Accordingly, the working medium flows centrifugally into the pump wheel and centrifugally out of the pump wheel or respectively centrifugally into the pump wheel and partially centrifugally and partially axially out of the pump wheel.

According to the present invention, a first guide wheel is provided, for example the guide wheel that is adjustable around the axis of rotation, wherein the guide wheel is preferably arranged for a purely centrifugal or diagonal-centrifugal flow with the working medium in the working chamber. Accordingly, the working medium flows centrifugally or partially centrifugally and partially axially into the first guide wheel and centrifugally out of the first guide wheel. The adjustable blades are herein arranged in the area of the guide wheel through which the purely centrifugal flow occurs.

A first guide wheel is arranged in the working chamber in the direction of flow of the working medium before the pump wheel, in particular immediately before the pump wheel. In the arrangement of the first guide wheel immediately before the pump wheel, no additional blade wheel or no additional blades are provided between the outlet of the first guide wheel and the inlet into the pump wheel. This means that the outlet grate edge, or respectively the outlet edges of the vanes of the guide wheel, are positioned immediately opposite the inlet grate edge, or the inlet edges of the blades of the pump wheel.

In addition, a second guide wheel is preferably provided which is arranged for a purely axial, diagonal-axial, or axial-diagonal flow of the working medium in the working chamber. Accordingly, the working medium flows partially radially and partially axially or exclusively axially into the second guide wheel and exclusively axially, or respectively partially axially and partially radially out of the second guide wheel.

The second guide wheel is arranged in the direction of flow of the working medium in the working medium circuit, in particular behind the pump wheel.

An inlet grate edge of the first guide wheel, or respectively the inlet edges of the blades of the first guide wheel are, relative to the axis of rotation of the pump wheel and the turbine wheel, positioned preferably on a radius that corresponds, at least substantially, to the radius of the inlet grate edge or respectively the inlet edges of the blades of the turbine wheel. The radius of the inlet grate edge of the first guide wheel is 0.8 times to 1.2 times, in particular 0.9 times to 1.1 times or 0.95 times to 1.05 times the radius of the inlet grate edge of the turbine wheel. The radius of the inlet grate edge of the first guide wheel is preferably 0.9 times the radius of the inlet grate edge of the turbine wheel.

The radius of the inlet grate edge, or respectively the inlet edges of the blades of the pump wheel, is preferably 1.1 times to 1.3 times, in particular 1.2 times the radius of the inlet grate edge, or respectively the inlet edges of the blades of the turbine wheel.

The second guide wheel can be designed, in particular, as a fixed guide wheel, accordingly, not having blades that are adjustable around an axis of rotation, or relative to the working medium flow.

According to one embodiment of the present invention, the second guide wheel is equipped with splitter blades in the outlet region. This means that the second guide wheel has a plurality of guide vanes which are arranged in two groups adjacent to one another, in the working chamber behind one another, wherein the number of the guide vanes of the first group is smaller than the number of guide vanes of the second group; or it can also be the same number. The guide vanes of the first group can, for example, have a comparatively long axial extension, in particular a longer axial extension than a radial extension. The guide vanes can be of a predefined thickness to guide the working medium.

According to one embodiment of the present invention, three guide wheels are provided in the working chamber, for example a first guide wheel in a radial flow-through region of the working chamber, a second guide wheel on an outer diameter in an axial flow-through region of the working chamber, and a third guide wheel in an axial flow-through region on a radial inner diameter of the working chamber in the flow direction of the working medium after the turbine wheel. The third guide wheel can, for example, provide a support function for components or respectively wall parts which limit the working chamber radially inside relative to the working medium circuit, that is to say, which form the meridian contour of the working chamber.

The working chamber has a hollow toroidal shape, meaning, it has an annular shape in an axial section on each side of the rotational axis of the hydrodynamic converter, wherein the annular shape can deviate from a circular ring shape and can in particular have a varying thickness or respectively a variable cross section over the circumference of the annular shape. In other words, The working chamber of the converter through which the working medium flows is limited by an inner and an outer ring-shaped meridian profile contour which symmetrically circumferentially forms the working chamber, in which the blade wheels are arranged. The width of the channel, that is the distance between the outer and the inner meridian profile contour, varies, in particular in a suitable form, according to the requirements in the individual sections of the converter in the direction of flow.

If the aforementioned adjustable first guide wheel and the fixed second guide wheel are provided, and if a third guide wheel is also provided in the working chamber, the third guide wheel is positioned for a purely axial flow of the working medium.

The second guide wheel is preferably positioned on a larger diameter than the first guide wheel, and the third guide wheel is positioned on a smaller diameter than the first guide wheel.

According to one embodiment of the present invention, at least a fourth guide wheel is provided in the working chamber. The working medium flows through the fourth guide wheel in a diagonal-centripetal direction, or in a purely centripetal direction. The fourth guide wheel is preferably positioned between the second guide wheel and the turbine wheel, in particular immediately before the turbine wheel, so that the outlet grate edge or the outlet edge of the blades of the fourth guide wheel are positioned directly opposite the inlet grate edge of the turbine wheel, without an additional wheel or blades being interposed.

Such a fourth guide wheel is combined in particular, however, not mandatorily, with a simple second guide wheel, which does not have any splitter blades.

It is of course also possible to design the second guide wheel as a simple guide wheel without splitter blades and to position the fourth guide wheel with an axial through-flow or an axial-diagonal through-flow behind the second guide wheel.

It is favorable if the ratio of an inner diameter of the working chamber relative to an outer diameter of the working chamber is less than 0.2 or less than 0.1. According to one embodiment the ratio of the inner diameter (on the upward side of the meridian contour) relative to an outer diameter is correspondingly 0.1.

A ratio of a width of the working chamber in the direction of an axis of rotation of the pump wheel and the turbine wheel, relative to an outer diameter of the working chamber is preferably less than 0.5 or less than 0.4, for example 0.38 or 0.485.

One arrangement of a hydrodynamic converter of the present invention includes, for example, a drive machine and a multiphase pump, wherein the multiphase pump is driven by the drive machine. A hydrodynamic converter according to the invention is provided in the drive connection between the drive machine and the multiphase pump.

Multiphase pumps are particularly suitable for conveying a liquid-gas mixture and measures are taken to prevent the forming of an air pocket before the pump wheel of the multiphase pump. This prevents dry running of the pump.

The suction side of the multiphase pump is preferably throttled by a certain amount, so that the multiphase pump can independently suck in gas.

According to one embodiment of the invention oil and/or gas are conveyed with such a multiphase pump.

A hydrodynamic converter according to the invention can, for example, have a design speed ratio between 1.8 and 2.0 and a working range of up to 2.3.

The vanes of the adjustable guide wheel are individually rotatable in a range of rotation suitable for the representation of a flow channel in the guide wheel, that can be open to the maximum or completely closed. If an axially inner guide wheel is provided, this can be provided to create a desired meridian profile contour in the region between the turbine wheel and the pump wheel, and in addition to accommodate components for the adjustment of the guide vanes of the adjustable guide wheel.

The number of blades of the individual blade wheels of the hydrodynamic converter can be designed to be comparatively small, taking into consideration all requirements.

A converter according to the invention offers good solidity, which means a wide range of efficiency. The efficiency may for example be in a speed ratio range of between 1.3 and 2.2 above 75%. The efficiency can moreover be in a speed ratio range of between 1.4 and 2.4 above 75%. The speed ratio range describes the speed of the turbine wheel with respect to the speed of the pump wheel. Peak efficiencies can be between 80 and 82%, or even higher.

With the highest efficiency of for example more than 78 or 80%, the design speed ratio is for example 1.8 to 2.2.

The pressure rating psi for the pump wheel can for example be between 1.25 and 3, and the delivery rate phi at approximately at least 1.1. The power consumption of the pump wheel (lambda value) is preferably at least approximately $0.6 \times 10^3$.

The lambda gradient over the increasing speed ratio can be designed to be a slightly falling curve.

According to one embodiment of the invention the converter is designed such that the conversion is always less than 0.7, which means there is no coupling point, the torque of the turbine wheel is less in the entire speed ratio range than the torque of the pump wheel.

The preferred arrangement of the adjustable guide wheel directly before of the pump wheel allows for an especially well graduated characteristics diagram and thus favorable influenceability in regard to the power transmission of the converter. Graduated is understood to be the distance of the individual characteristic curves of the power consumption of the pump wheel and also of the turbine wheel speed, proportional to the angle of torsion of the adjustable blades (blades of the first guide wheel). The arrangement of the adjustable guide wheel immediately before the pump wheel can herein be achieved by a purely centrifugal flow through the guide wheel and also through an axial flow through the guide wheel when positioned accordingly in the working medium circuit.

The hydrodynamic converter is preferably speed limiting, that is, at increasing speeds of above the upper working region speed ratio, the turbine wheel ensures a breakdown in the circulating mass flow of the working medium and the therewith associated immediate attainment of the threshold point. In particular, the hydrodynamic converter is itself speed limiting above a speed ratio of 3.

The arrangement of the blade wheels, in particular the positioning of the pump wheel and the turbine wheel occurs in such a way that it makes possible a design speed ratio between the turbine wheel and pump wheel speed in the range of 1.8 to 2.0, as well as a working range of up to 2.3. This type of converter is therefore a high-speed converter.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
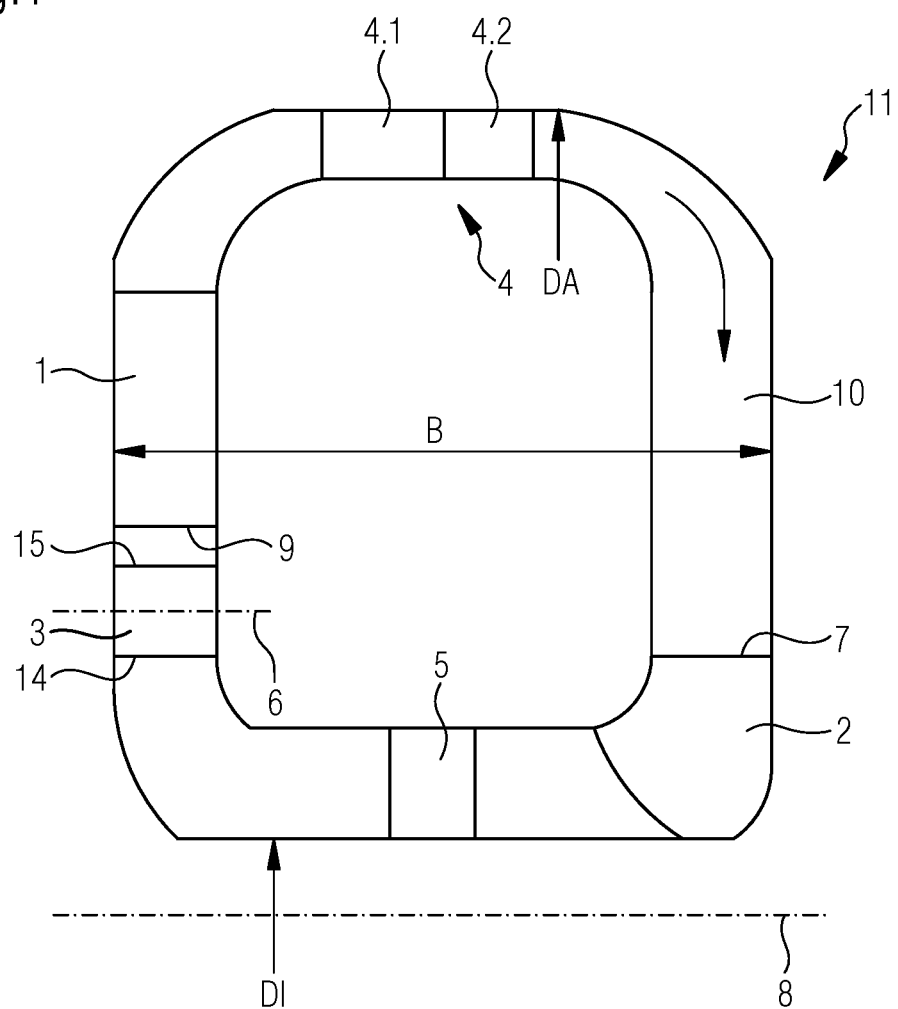
FIG. 1 illustrates a design example of an embodiment of an inventive high speed hydrodynamic converter of the present invention.

Referring now to the drawings, and particularly to FIG. 1 there is shown a schematic axial section through working chamber 10 of a hydrodynamic converter 11 on one side of axis of rotation 8. The working chamber has an inner diameter DI, an outer diameter DA and a width B, in each case based on an outer contour line of the hollow torus shaped working chamber 10, or respectively the meridian profile of working chamber 10.

Pump wheel 1 that has a centrifugal flow through it, is arranged in working chamber 10, as well as a turbine wheel 2 with a centripetal-diagonal flow through it. Inlet grate edge 7 of turbine wheel 2 is positioned on a smaller radius than inlet grate edge 9 of pump wheel 1. Pump wheel 1 is arranged approximately on the average diameter of working space 10, and turbine wheel 2 extends, at least substantially, to inner diameter DI of working space 10.

A fixed guide wheel 5 is arranged between turbine wheel 2 and pump wheel 1, namely in the inner region of working space 10, followed by an adjustable guide wheel 3, positioned radially a little further outside, before inlet grate edge 9 of pump wheel 1. An additional guide wheel 4 is moreover provided in the radially outer region of working chamber 10.

In the current example, guide wheel 3 before pump wheel 1 is designated as first guide wheel 3 which is adjustable about axis of rotation 6 of the guide wheel. Guide wheel 4, provided in the radially outer region of working chamber 10, is designated as the second guide wheel 4, which includes two groups of guide vanes 4.1, 4.2, wherein the number of guide vanes 4.2 of the second group is greater than or equal to the number of guide vanes 4.1 of the first group. Guide wheel 5 which is provided in the radially inner region of working chamber 10 is identified as third guide wheel 5.

First guide wheel 3 has an inlet grate edge 14 and an outlet grate edge 15. Outlet grate edge 15 is positioned directly opposite inlet grate edge 7 of pump wheel 1. Inlet grate edge 14 of first guide wheel 3 is positioned parallel to axis of rotation 8, so that the working medium flows purely centrifugally through first guide wheel 3.

Figure 2:
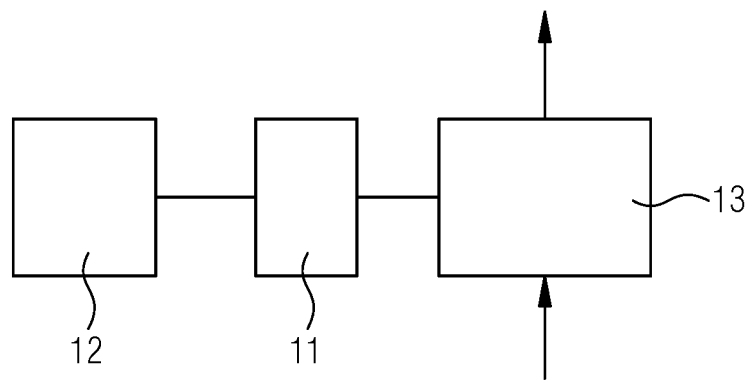
FIG. 2 is a design example of an inventive arrangement with a drive machine, a hydrodynamic converter, and a multiphase pump.

FIG. 2 shows an arrangement including a drive machine 12, wherein drive machine 12 drives a multiphase pump 13, which conveys a liquid-air mixture or liquid-gas mixture. The drive of multiphase pump 13 occurs herein by way of a hydrodynamic converter 11, designed according to the invention, as shown schematically in an example in FIG. 1.

Figure 3:
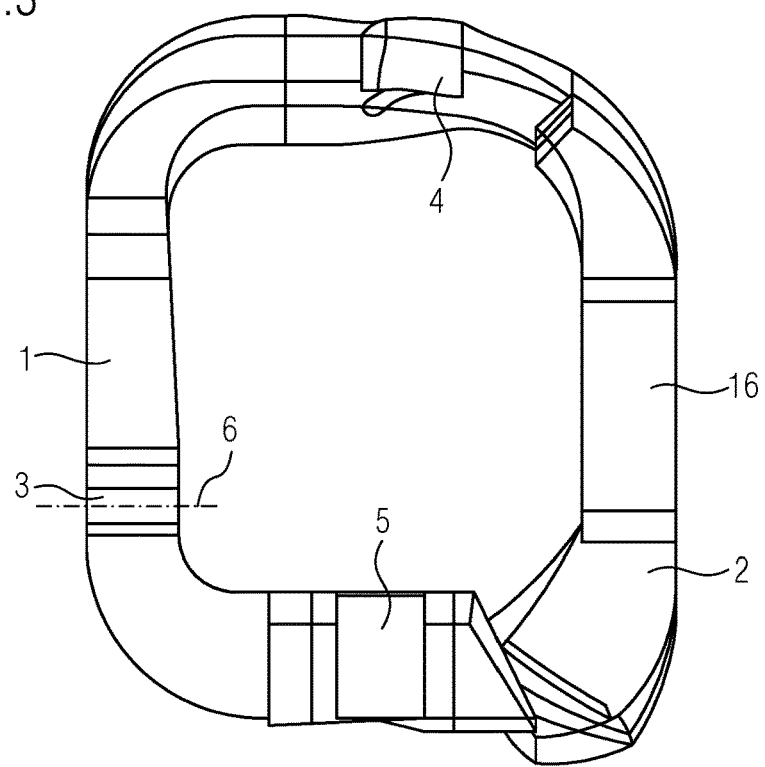
FIG. 3 additionally illustrates the converter according to FIG. 1 with a modified arrangement of blade wheels.

According to FIG. 3, second guide wheel 4 is a simple guide wheel, in other words, designed without splitter blades. Instead, a fourth guide wheel 16 is positioned after second guide wheel 4, viewed in a direction of flow of the working medium. Fourth guide wheel 16 is positioned immediately before turbine wheel 2, and in the illustrated design example the flow through it occurs in a purely centripetal direction. Alternatively, a diagonal-centripetal flow could however also be provided.

Figure 4:
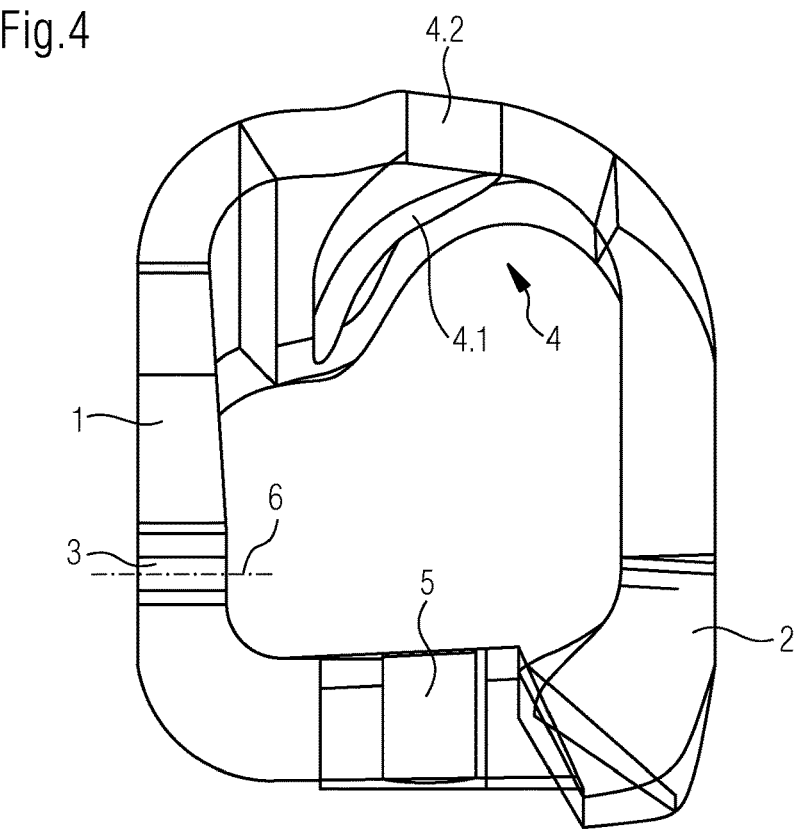
FIG. 4 is a further illustration according to FIG. 3 with an arrangement of blade wheels with splitter blades on the second guide wheel.

In the arrangement according to FIG. 4, the fourth guide wheel is again dispensed with. Instead, second guide wheel 4 is equipped with splitter blades, including a first group of guide vanes 4.1 and a second group of guide vanes 4.2, wherein the orientation of the first group of guide vanes 4.1 and/or the number thereof is different from the orientation of the second group of guide vanes 4.2 and/or the number thereof.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST

1 Pump wheel
2 turbine wheel
3 first guide wheel
4 second guide wheel
4.1 first group of guide vanes
4.2 second group of guide vanes
5 third guide wheel
6 guide wheel axis of rotation
7 inlet grate edge
8 axis of rotation
9 inlet grate edge
10 working chamber
11 hydrodynamic converter
12 drive machine
13 multiphase pump
14 inlet grate edge
15 outlet grate edge
16 fourth guide wheel

What is claimed is:

1. A hydrodynamic converter having a working chamber for forming a hydrodynamic working medium circuit, the hydrodynamic converter comprising:
    at least one pump wheel;
    at least one turbine wheel; and
    at least one guide wheel, the at least one pump wheel, the at least one turbine wheel and the at least one guide wheel being positioned in the working chamber, wherein working medium flows through the at least one pump wheel centrifugally or centrifugally-diagonally and the working medium flows through the at least one turbine wheel centripetally or centripetally-diagonally, the at least one turbine wheel having an inlet grate edge, the at least one pump wheel having an inlet grate edge, the inlet grate edge of the of the at least one turbine wheel having a smaller or equal radius than the inlet grate edge of the at least one pump wheel relative to an axis of rotation of the pump wheel and the turbine wheel,
    the at least one guide wheel including a first guide wheel provided in the working chamber upstream from the at least one pump wheel in a direction of flow of the working medium, the first guide wheel being arranged for purely centrifugal or diagonal-centrifugal flow of the working medium therethrough.

2. The hydrodynamic converter of claim 1, wherein the first guide wheel has an inlet grate edge which relative to the axis of rotation is positioned on a radius that substantially corresponds to the radius of the inlet grate edge of the at least one turbine wheel.

3. The hydrodynamic converter of claim 2, wherein
the radius of the inlet grate edge of the first guide wheel is 0.8 times to 1.2 times, or 0.9 times to 1.1 times or 0.95 times to 1.05 times the radius of the inlet grate edge of the at least one turbine wheel.

4. The hydrodynamic converter of claim 1, wherein the first guide wheel is arranged immediately before the at least one pump wheel viewed in the direction of flow of the working medium.

5. The hydrodynamic converter of claim 1, wherein the at least one guide wheel further includes a second guide wheel provided in the working chamber which is arranged for a purely axial or diagonal-axial, or axial-diagonal throughflow of the working medium.

6. The hydrodynamic converter of claim 5, wherein the first guide wheel has guide vanes which are adjustable about a guide wheel axis of rotation, the guide vanes being variably adjustable with respect to the working medium flow, wherein the guide wheel axis of rotation is parallel or diagonal to the axis of rotation of the pump wheel and the turbine wheel.

7. The hydrodynamic converter of claim 6, wherein the second guide wheel is a fixed guide wheel.

8. The hydrodynamic converter of claim 7, wherein the second guide wheel has a plurality of guide vanes which are arranged in two groups adjacent to one another, behind one another in the working chamber, a number of guide vanes of the first group is smaller than a number of guide vanes of the second group.

9. The hydrodynamic converter of claim 8, wherein the at least one guide wheel further includes a third guide wheel in the working chamber.

10. The hydrodynamic converter of claim 9, wherein the third guide wheel is positioned for a purely axial flow of the working medium.

11. The hydrodynamic converter of claim 10, wherein the second guide wheel is positioned on a larger diameter than the first guide wheel, and the third guide wheel is positioned on a smaller diameter than the first guide wheel.

12. The hydrodynamic converter of claim 1, wherein the at least one guide wheel further includes a second guide wheel and a third guide wheel each being provided in the working chamber, the first guide wheel or the third guide wheel has guide vanes which are adjustable about a guide wheel axis of rotation and are variably adjustable with respect to the working medium flow during operation of the converter, one of these two guide wheels is without adjustable guide vanes supports wall components which limit the working chamber radially inside relative to the working medium circuit.

13. The hydrodynamic converter of claim 12, wherein a ratio of an inner diameter of the working chamber relative to an outer diameter of the working chamber is less than 0.2 or less than 0.1.

14. The hydrodynamic converter of claim 13, wherein a ratio of a width of the working chamber in the direction of the axis of rotation of the pump wheel and the turbine wheel, relative to an outer diameter of the working chamber is less than 0.5 or less than 0.4.

15. The hydrodynamic converter of claim 1, wherein the radius of the inlet grate edge of the pump wheel is 1.1 times to 1.3 times the radius of the inlet grate edge of the turbine wheel.

16. The hydrodynamic converter of claim 1, wherein
the arrangement of the positioning of the pump wheel and the turbine wheel makes possible a speed ratio between the turbine wheel and the pump wheel speed in the range of 1.8 to 2.0, as well as a working range of up to 2.3.

17. An arrangement with a drive machine and a multiphase pump driven by the drive machine, wherein the drive connection between the drive machine and the multiphase pump is a hydrodynamic converter according to claim 1.

* * * * *